(12) United States Patent
Fadel et al.

(10) Patent No.: US 10,275,483 B2
(45) Date of Patent: Apr. 30, 2019

(54) N-GRAM TOKENIZATION

(71) Applicant: Apple Inc., Cupertino, CA (US)

(72) Inventors: Rony Fadel, Paris (FR); Edouard Godfrey, Paris (FR); Alexandre Carlhian, Paris (FR)

(73) Assignee: Apple Inc., Cupertino, CA (US)

( * ) Notice: Subject to any disclaimer, the term of this patent is extended or adjusted under 35 U.S.C. 154(b) by 651 days.

(21) Appl. No.: 14/455,712

(22) Filed: Aug. 8, 2014

(65) Prior Publication Data
US 2015/0347422 A1    Dec. 3, 2015

Related U.S. Application Data

(60) Provisional application No. 62/005,992, filed on May 30, 2014.

(51) Int. Cl.
*G06F 7/00* (2006.01)
*G06F 17/30* (2006.01)

(52) U.S. Cl.
CPC .............. *G06F 17/30389* (2013.01)

(58) Field of Classification Search
CPC ................................. G06F 17/30389
See application file for complete search history.

(56) References Cited

U.S. PATENT DOCUMENTS

| | | |
|---|---|---|
| 8,473,507 B2 | 6/2013 | Loofbourrow |
| 8,515,954 B2 | 8/2013 | Gibbs et al. |
| 8,521,739 B1 | 8/2013 | Pasca et al. |
| 2007/0150278 A1* | 6/2007 | Bates ............... G10L 15/197 704/257 |
| 2010/0145970 A1* | 6/2010 | Gorti ............... G06F 17/3066 707/759 |
| 2012/0030215 A1* | 2/2012 | Herron ............ G06F 17/3064 707/748 |
| 2012/0259829 A1 | 10/2012 | Zhou | |

OTHER PUBLICATIONS

Ziv Bar-Yossef, et al. "Context-Sensitive Query Auto-Completion", WWW '11 Proceedings of the 20th International Conference on World Wide Web, Mar. 28, 2011, pp. 106-116, ACM, New York, NY.

* cited by examiner

*Primary Examiner* — Tuan A Pham
(74) *Attorney, Agent, or Firm* — Womble Bond Dickinson (US) LLP

(57) ABSTRACT

A method and apparatus of a device that suggests a tokenized query completion for an input query prefix is described. In an exemplary embodiment, the device receives a query prefix from a client, wherein the query prefix includes a plurality of words. The device further generates a results set by searching a structured database using the query prefix for matches to the plurality of words in the query prefix. The device additionally determines a subset of query prefix that match specific fields of the results set by using the last N grams in the query prefix. In addition, the device ranks a tokenized query completion as a search suggestion using the query prefix, where the tokenized query completion includes a token that is a match between a matching word in the subset of query prefix and the corresponding specific field for the matching word.

13 Claims, 8 Drawing Sheets

N-GRAM TOKENIZATION

RELATED APPLICATIONS

Applicant claims the benefit of priority of prior, co-pending provisional application Ser. No. 62/005,992 filed May 30, 2014, the entirety of which is incorporated by reference.

FIELD OF INVENTION

This invention relates generally to search technology and more particularly to provide search query suggestions based on the last N words of the query prefix.

BACKGROUND OF THE INVENTION

A user can perform a query search to lookup information stored on a device. A query search begins with a client on the device receiving the query string, which is sent to a local search module. The client can be one of variety of applications that support local search (e.g., mail, media, calendar, and the file browser). The local search module receives query string and searches a search index for results that match this query string. The local search module then returns the results to the client. In order to assist the user on the client, the search server may also suggest query completions based on a partially entered query string. The suggested query completions are presented to the user, so that the user can choose one of the query completions as the string to be used for the search.

The suggested query completions, however, do not take advantage of the structure that is available in the local search index, because the suggested query completions match the words in the query prefix. A user may specify, by using keywords, that specific words in the query prefix match specific metadata, but this format is difficult to use.

SUMMARY OF THE DESCRIPTION

A method and apparatus of a device that suggests tokenized query completions for an input query prefix is described. In an exemplary embodiment, the device receives a query prefix from a client, wherein the query prefix includes a plurality of words. The device further generates a results set by searching a structured database using the query prefix for matches to the plurality of words in the query prefix. The device additionally determines a subset of query prefix that match specific fields of the results set by using the last N grams in the query prefix. In addition, the device ranks a tokenized query completion as a search suggestion using the query prefix, where the tokenized query completion includes a token that is a match between a matching word in the subset of query prefix and the corresponding specific field for the matching word.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
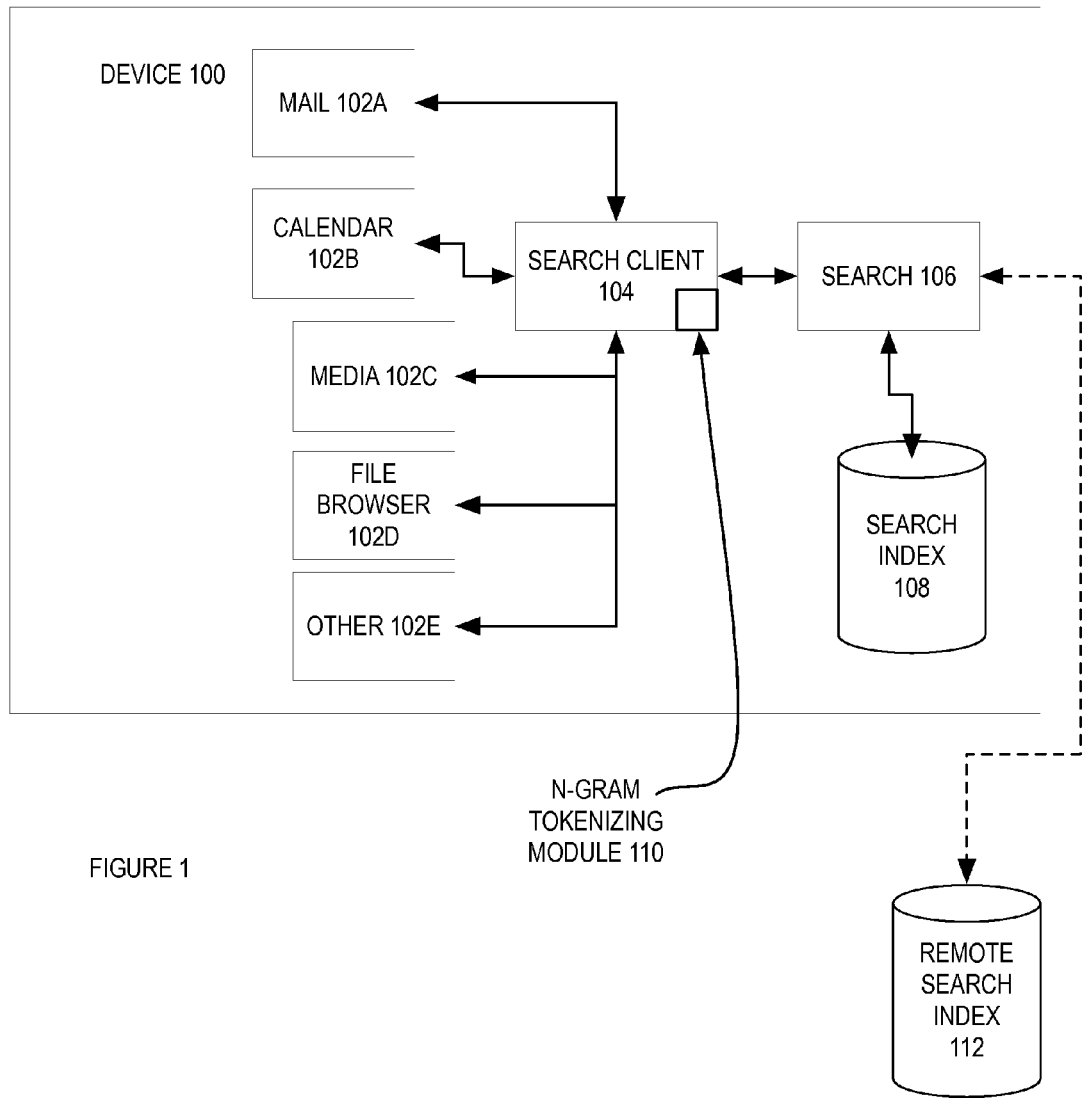
FIG. 1 is a block diagram of one embodiment of a device that suggests tokenized query completions.

A method and apparatus of a device that suggests tokenized query completions for an input query prefix is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that suggests a tokenized query completion for an input query prefix is described. In one embodiment, the device receives a query prefix from an application running on the device (e.g., mail, calendar, file browser, media player, or some other application on the device). In this embodiment, the query prefix is free text, which is a text without tokens. In one embodiment, a token is a gram of the query prefix that is matched with a field in a search index. For example and in one embodiment, in the free text of the query prefix "maps alex jones," a token for the gram "alex" could "people:alex" or "to:alex," where these tokens are match the gram "alex" to either the field for "people" or "to", depending on whether the match is for the person "alex" in the Contacts data or an email addressed to "alex". In one embodiment, the search index is a metadata database that stores metadata about the objects stored on the device. Each type of metadata stored in the search index is a field in the search index. While in embodiment, the search index is a local search index for content stored on the device, in alternate embodiment, the search index is a search index for remotely stored content (e.g., remote search index 112 in FIG. 1).

In one embodiment, the device provides a set of tokenized query completions for the query prefix. In this embodiment, the device sends the query prefix to the search module to determine a set of matches to objects referenced in the search index. The set of matches is a results set that the device uses to generate a set of tokenized query completions. In one embodiment, the device uses the last N grams (e.g. words) of the query prefix to determine matches for the result set to specific fields in the search index. For example and in one embodiment, for the query prefix "maps alex jones," the last two grams can be used to return the following tokenized query suggestions: {"TO:alex, FROM:jones, maps," "SONG:jones, alex, maps," "TO:alex, jones, maps"}.

FIG. 1 is a block diagram of one embodiment of a device 100 that suggests tokenized query completions. In one embodiment, the device 100 can be personal computer, laptop, server, mobile device (e.g., smartphone, laptop, personal digital assistant, music playing device, gaming device, etc.), and/or any device capable requesting and/or displaying a query. In one embodiment, the device can be a physical or virtual device. In one embodiment, the device 100 includes different applications 102A-E that use a search client 104 to perform a search of object stored on the device 100. In this embodiment, a search is a search of the object stored on the device 100. For example and in one embodiment, the objects can be documents, pictures, music, applications, email, calendar entries, and/or other objects stored in the device 100. In one embodiment, the search is based on an index that is maintained by the search module. In this embodiment, the index is an index of the metadata stored in objects of the device.

In one embodiment, each of the metadata stored in the index has a type. For example and in one embodiment, the metadata types can include creation date, modification date, upload date, files size, file type, attachment type (PDF, JPEG, etc.), metadata types within the object (e.g., "To," "From," "CC," "Subject," ID3 tags with media, "Date," "Time," "location," "name," "address," etc.), and/or other data types stored within each of the objects. The metadata contents and types are stored in the search index 108. To search the search index, the applications 102A-E can each capture a query prefix and send this query prefix to the search client 104, which in turn, sends the query prefix to the search module 106 to performs the search. For example and in one embodiment, the mail application 102A includes a search field to search for relevant emails or used for a general search. Similarly, the applications calendar 102B, media player 102C, file browser 102D, and/or other applications 102E (e.g., contacts) can use the search client to search for objects stored on the device 100. In another embodiment, the search facility (e.g., search client 104, search module 106, search index 108, and/or combination thereof) is partially or fully encompassed in the application itself.

In one embodiment, the query prefix is a string of characters that is used to match all of the characters in the search index. For example and in one embodiment, the query "maps alex jones" would match any occurrence of objects that includes the grams "maps alex jones." In this embodiment, a problem is that this search does not take advantage of the structure that is embodied in the search index. For example and in one embodiment, some of the objects could match the words "alex jones" in the "To" metadata field and while matching "maps" in another field or any field. By not taking advantage of the structure of the search index, the search space is all of the objects on the device. This can be too large a search space, as the user may have a specific set of results the user intends to search with the query prefix.

In one embodiment, to help guide the search process, the search client determines query suggestions for the query prefix using the metadata data and types stored in the search index. In this embodiment, the search client 104 receives a free text query prefix from one of the applications 102A-E and provides a set of ranked tokenized query completions. In one embodiment, a tokenize query completion is a query completion that matches one or more of the grams in the query prefix to one of the metadata types stored in the search index. For example and in one embodiment, a query prefix "maps alex jones" could be converted into a tokenized query completion of "any:maps to:alex subject:jones," "any:maps artist:alex song:jones," and "subject:maps to:alex to:jones." In this example, the first tokenized query completion would match objects that have the "To" field with the word "alex," the "Subject" field matching the word "Jones" and any field matching the word "maps." This tokenized query completion could be used to match emails with the words "alex" in the "To" field, the word "Jones" in the "Subject" field, and the word in any of the fields. The second tokenized query completion would match objects that have the "To" field with the word "alex," the "Subject" field matching the word "Jones" and any field matching the word "maps." This tokenized query completion could be used to match media files with the words "alex" in the "Artist" field, the word "Jones" in the "Song" field, and the word "maps" in any of the fields. The third tokenized query completion would match objects that have the "To" field with the words "alex" and "jones" and any field matching the word "maps." This tokenized query completion could be used to match media files with the words "alex jones" or "alex" and "jones" in the "To" field and the word "maps" in any of the fields. Each of the tokenized query completions would narrow the scope of the search and provides more focused results for the user query prefix. While in one embodiment, device 100 determines a set of tokenized query completions for the search index, in alternate embodiments, device 100 can determine a set of tokenized query completions for other types of structures databases that store metadata, whether locally stored or remotely stored on a server coupled to the device via a network (e.g., a online media store, an application store, or another type of online store of database that stores searchable metadata).

In one embodiment, the search client 106 includes an N-Gram tokenizing module 110 that receives the query prefix and returns a set of tokenized query completions to the user. In one embodiment, the N-Gram tokenizing module 110 receives the query prefix as free text and makes a call to the search module 106 to determine a results set of object which are objects stored on the device matching the words in the query prefix. Using the results set, the N-Gram tokenizing module 110 searches this results set for matches to specific metadata types with the last gram in the query prefix. In one embodiment, a gram in the query prefix can be a word in the query prefix string. For example and in one embodiment, if the query prefix is "maps alex jones," the N-Gram tokenizing module 110 searches the results set for matches to the gram "jones." For each match, the N-Gram tokenizing module 110 stores each match as a possible query completion. For example and in one embodiment, if there are matches for "jones" to the fields "To," "Subject," and "Song," the possible query completions for this pass would be "maps alex to:jones," "maps alex subject:jones," and "maps alex song:jones." In one embodiment, a token is a gram of the query prefix that is matched with a field in a search index. For example and in one embodiment, in the free text of the query prefix "maps alex jones," a token for the gram "alex" could "people:alex" or "to:alex," where these tokens are match the gram "alex" to either the field for "people" or "to", depending on whether the match is for the person "alex" in the Contacts data or an email addressed to "alex". In one embodiment, a tokenized query completion is a free text query prefix that has been converted into a query that include one or more tokens that are used to reduce the search space of the query. These query completions are stored so as to be ranked and possibly be presented to the user later.

In one embodiment, the N-Gram tokenizing module 110 searches the results set using the last two grams. In this embodiment, if the query prefix is "maps alex jones," the N-Gram tokenizing module 110 searches the results set for matches to the word "alex" and "jones." For example and in one embodiment, if there are matches for "alex" to the fields "Artist" and "To" and "jones" to the fields "To," "Subject," and "Song," the possible query completions for this pass would be "maps to:alex to:jones," "maps to:alex subject:jones," and "maps artist:alex song:jones." The N-Gram tokenizing module 110 continues this search for query completions using successively larger set of grams until there are no more possible completions or the number of results completions meets a threshold. Thus, the N-Gram tokenizing module 110 searches for possible tokenized query completions using the last N grams of the query prefix. In one embodiment, an N-gram is a sequence of N items from a given sequence of text or speech. The items can be phonemes, syllables, letters, words or base pairs according to the application. The N-grams can be collected from a text or speech corpus. In one embodiment, a N-gram is a collection of words in the query prefix. In one embodiment, the N-gram tokenization module 110 bases the analysis of the last N-grams of the query prefix because these last N-grams may be more relevant to what the user is searching for than taking the query prefix as a whole. For example and in one embodiment, for the query prefix "maps john smith," the string "john" may be more relevant than the string "maps" to what the user is typing. In this embodiment, "john" would play a larger part in ranking and/or filtering of the results.

In one embodiment, the N-Gram tokenizing module 110 ranks this tokenized query completions and sends the ranked tokenized query completions back the application that provided the query prefix. In this embodiment, the N-Gram tokenizing module 110 ranks the query completions based on the number of tokens in the query completions. A query completion with a greater number of tokens would represent a more focused search and thus may be more preferable to a user. For example and in one embodiment, a query completion with two tokens would rank higher than a query completion that has one token. Thus, a query completion of "maps to:alex subject:jones" would be ranked higher than "maps alex subject:jones."

Figure 2:
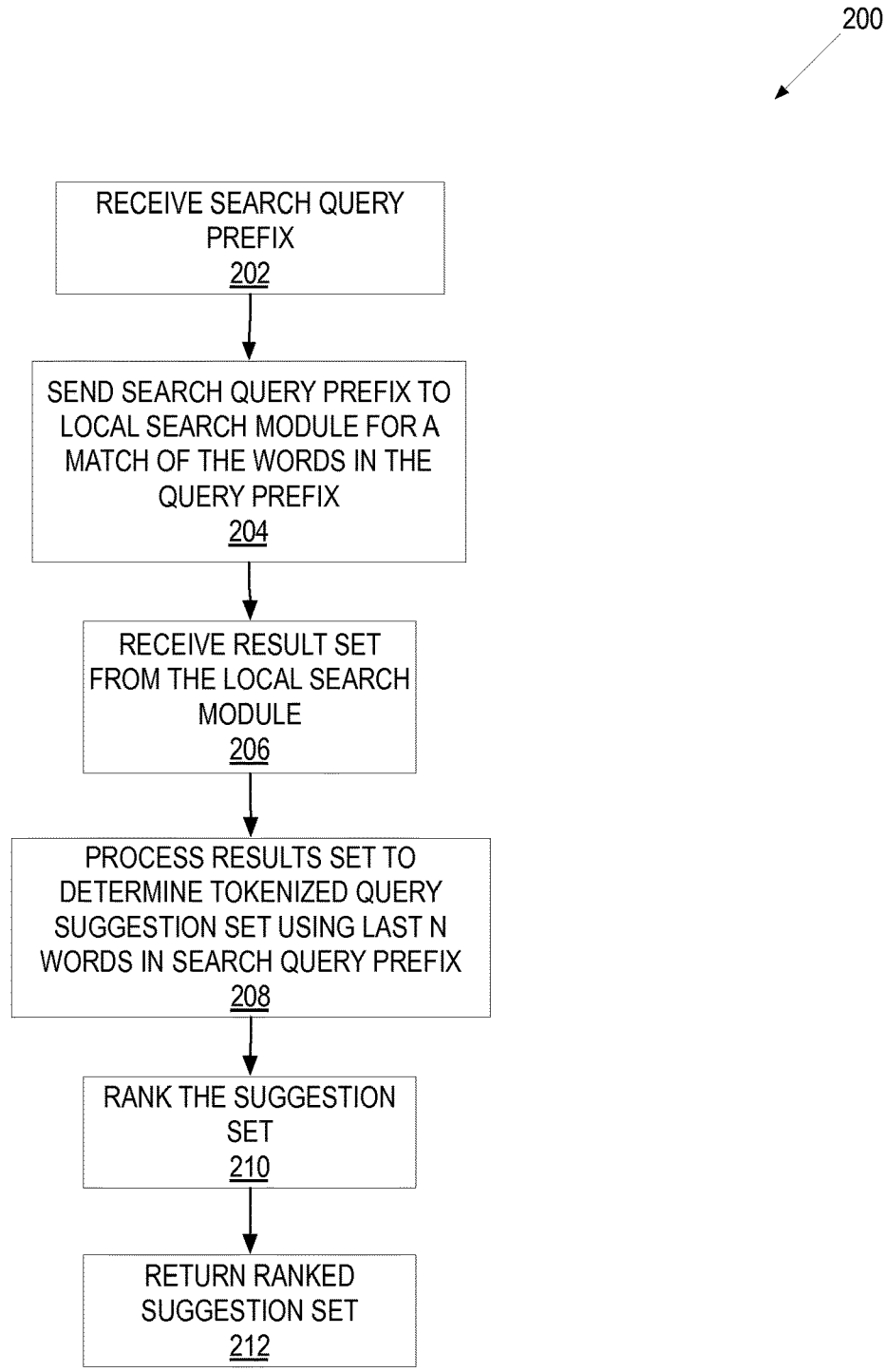
FIG. 2 is a flowchart of one embodiment of a process to determine a set of suggested ranked tokenized query completions.

FIG. 2 is flowchart of one embodiment of a process 200 to determine a set of suggested ranked tokenized query completions. In one embodiment, the N-Gram tokenizing module 110 performs process 200 to determine a set of suggested ranked tokenized query completions. In FIG. 2, process 200 begins by receiving the query prefix at block 202. In one embodiment, the query prefix is a search string that is input by a user in an application and sent to process 200. In one embodiment, the input can entered by text, spoken word, automatically generated, and/or some other way to entry a query prefix. For example and in one embodiment, the user can enter a query prefix in file browser or calendar application as described in FIG. 1 above. At block 204, process 200 sends the query prefix to the search module for a match of the grams in the prefix. In one embodiment, process 200 formats a query such that the query determines a match for any object in the search index that match each of the grams in the query, where the match can be in any field of the index. For example and in one embodiment, if the query prefix is "maps alex jones," process 200 sends a query such that search returns a set of object that match "maps," "alex," and "jones" in any field. Process 200 receives the results form the search module at block 206. In one embodiment, the returned results are the results set that is used to determined the tokenized query completions below.

At block 208, process 200 processes the results set to determine a set of tokenized query completions using the last N grams in the search query prefix. In one embodiment, process 200 successively determines query completions using the last gram, last two grams, . . . , up until the last N grams. Alternatively, process 200 can determine the set of tokenized query completions using a different pattern of grams. Determining the set of tokenized query suggestions is further described in FIG. 3 below. Process 200 ranks this set of tokenized query suggestions at block 210. In one embodiment, process 200 ranks each of the tokenized query suggestions based on the number of tokens in the tokenized query suggestions. For example and in one embodiment, a query completion with a greater number of tokens would represent a more focused search and thus may be more preferable to a user. For example and in one embodiment, a query completion with two tokens would rank higher than a query completion that has one token. Thus, a query completion of "maps to:alex subject:jones" would be ranked higher than "maps alex subject:jones." In another embodiment, process 200 can also rank the results based on how close the results textually match the query prefix (e.g., fuzzy matching, typos, misspellings, etc.) For example and in one embodiment, queries with the "they're gone" and "there gone" are searched using the string "they're gone" in the search index.

Process 200 returns the ranked set of tokenized query suggestions at block 212. In one embodiment, process 200 returns the ranked set of tokenized query completions to the application that initially sent the query prefix. In this embodiment, the ranked set of query completions are presented to the user, where the user can choose one of the tokenized query completions to complete the query search. In this embodiment, each of the tokenized query completion represents a reduced search space because each token indicates a specific match with the metadata in the search index.

Figure 3:
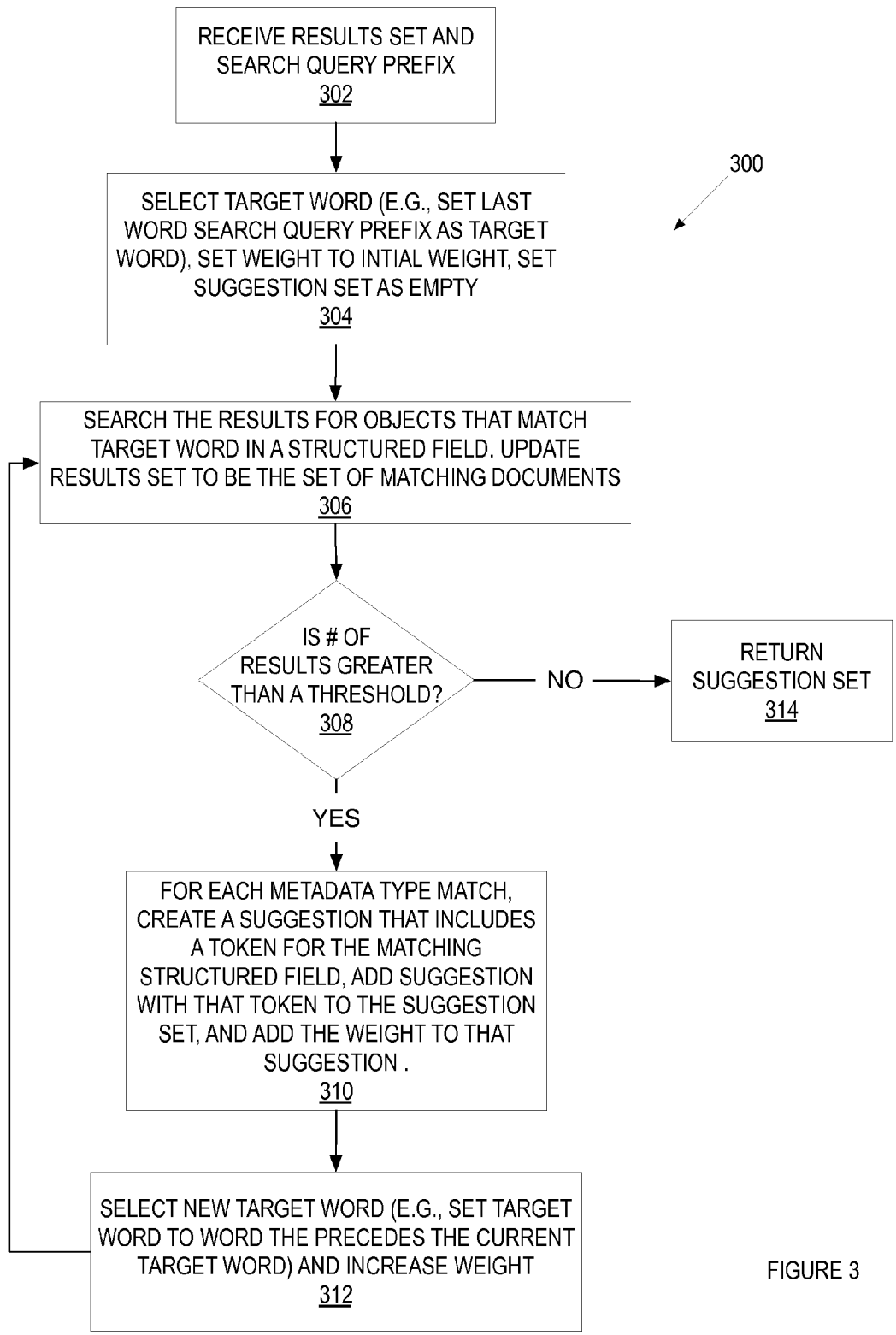
FIG. 3 is a flowchart of one embodiment of a process to determine a set of suggested tokenized query completions.

FIG. 3 is a flowchart of one embodiment of a process 300 to determine a set of suggested tokenized query completions. In one embodiment, process 200 performs process 300 to determine a set of suggested tokenized query completions as described in FIG. 2, block 208 above. In FIG. 3, process 300 begins by receiving the results set and search query prefix at block 302. In one embodiment, the results set is the set of objects that match the grams in the query prefix as described in FIG. 2, block 206 above. Process 300 selects a target gram, sets a weight to an initial weight, and sets the suggestion set to an empty set at block 304. In one embodiment, the target gram can be the last gram in the query prefix. For example and in one embodiment, if the query prefix is "maps alex jones," the last gram is "jones." In another embodiment, process 300 selects the target gram in a different fashion (e.g., random selection of the gram from the grams in the query prefix, random selection of the gram from a subset of grams in the query prefix (e.g., last N grams), or some other way to select a gram. In one embodiment, the weight is a metric used to rank the tokenized query completions based on the number of tokens in each query completion. For example and in one embodiment, a query completion with three tokens would has a greater weight than a query completion with two tokens, which is in turn has a greater weight than a query completion with one token. In one embodiment, the suggestion set is the set of possible tokenized query completions.

At block 306, process 300 searches the results set for objects that match the target gram in a structured field. In one embodiment, process 300 searches for the results set for objects that include metadata that matches the target gram. In this embodiment, updates the results set to be the set of objects matching the target gram. In addition, process 300 determines the metadata type matches for each target gram. For example and in one embodiment, the target gram may match objects in the "To," "Song," and "Subject" metadata types. In this example, each of these matches would be a match in a structured field of the search index. Process 300 determines if the number of matching objects is greater than a threshold at block 308. In one embodiment, the threshold could be zero or a positive integer. If the number of results is not greater than the threshold, process 300 returns the suggestion set at block 314. If the number of results is greater than the threshold, process 300 creates a query suggestion that includes a token for the matching structured field for metadata type match at block 310. In one embodiment, if the target gram matches objects in the "To," "Song," and "Subject" metadata types for the target gram "jones", process 300 creates the tokens "to:jones," "song:jones," and "subject:jones." In addition, process 300 adds a suggestion with each of the tokens to the suggested query completion set with the current weight. In one embodiment, the current weight is based upon the number of tokens in the query completion. In another embodiment, the current weight can also be based on how close the tokens match the query prefix.

At block 312, process 300 selects a new target gram. In one embodiment, process 300 selects the gram that precedes the current target gram in the query prefix. For example and in one embodiment, if the query prefix is "maps alex jones" and the current target gram is "jones," the new target gram is "alex." In another embodiment, process 300 selects the target gram in a different fashion (e.g., random selection of the gram from the grams in the query prefix, random selection of the gram from a subset of grams in the query prefix (e.g., last N grams), or some other way to select a gram. In addition, process 300 increases the weight, so as to indicate that the next query completion suggestion will include more tokens and should be weighted higher. Thus, process 300 takes in a results set and search query and returns the set of tokenized query completions.

Figure 4:
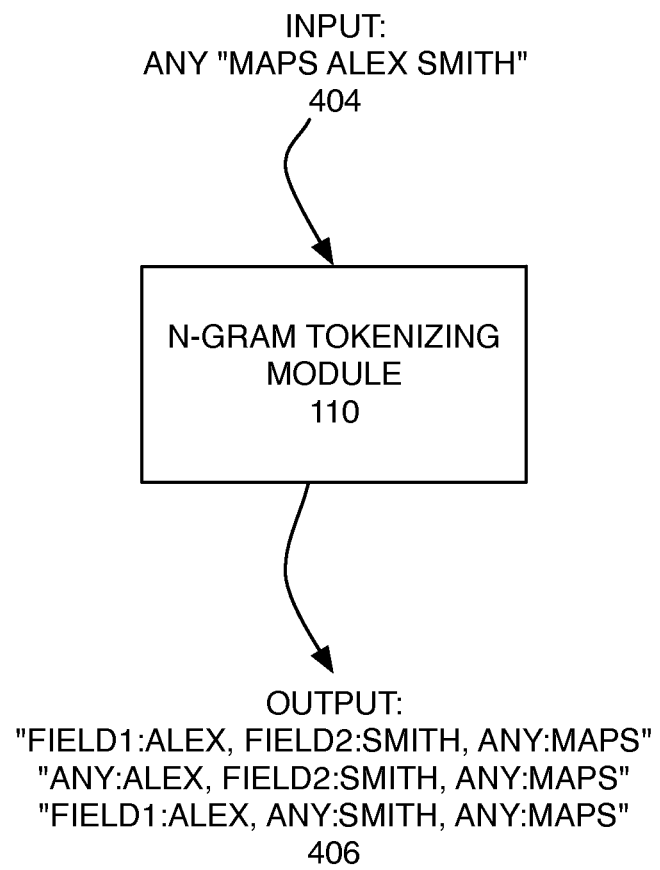
FIG. 4 is an illustration of one embodiment to converting a query prefix to a set of tokenized query completion.

FIG. 4 is an illustration of one embodiment to converting a query prefix to a tokenized query completion. In one embodiment, the N-Gram tokenizing module 110 receives an input query prefix 402 that is a string of free text. In this embodiment, the input query prefix is "maps alex jones." The N-Gram tokenizing module 110 receives this query prefix and returns the set of tokenized query completions {"field1:alex, field2:jones, any:maps," "any:alex, field2: jones, any:maps," "field1:alex, any:jones, any:maps"}. In this embodiment, the first query completion is ranked higher than the other two because this completion has more tokens (2) that the other query completions.

Figure 5:
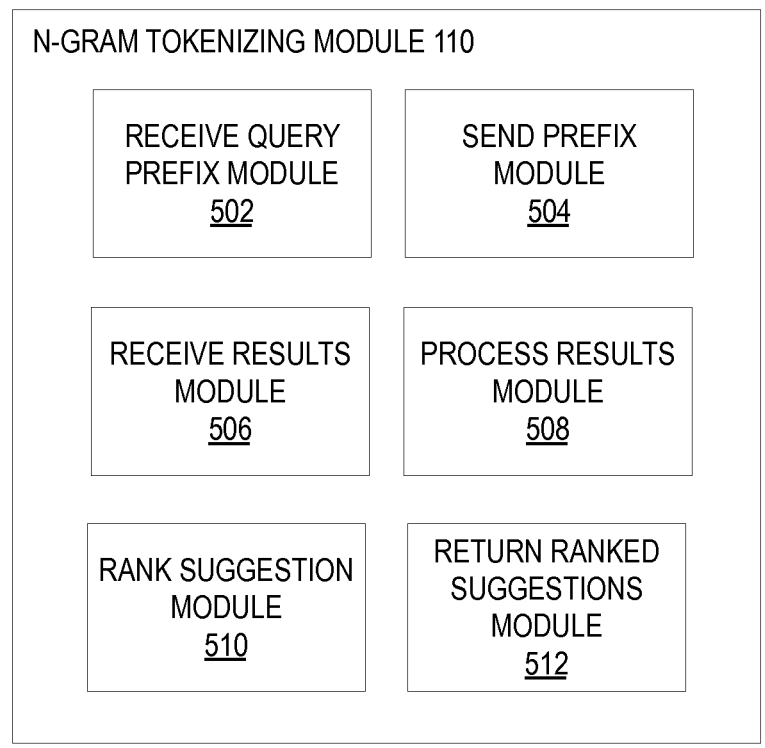
FIG. 5 is a block diagram of one embodiment of a N-Gram tokenizing module to determine a set of suggested ranked tokenized query completions.

FIG. 5 is a block diagram of one embodiment of a N-Gram tokenizing module 110 to determine a set of suggested ranked tokenized query completions. In one embodiment, the N-Gram tokenizing module 110 includes a receive query prefix module 502, send prefix module 504, receive results module 506, process results module 508, rank suggestion module 510, and return ranked suggestions module 512. In one embodiment, the receive query prefix module 502 receives the query prefix as described in FIG. 2, block 202 above. The send prefix module 504 sends the prefix to search module as described in FIG. 2, block 204 above. The receive results module 506 receives the results as described in FIG. 2, block 206 above. The process results module 508 processes the results as described in FIG. 2, block 208 above. The rank suggestion module 510 ranks the suggestions as described in FIG. 2, block 210 above. The return ranked suggestions module 512 returns the ranked suggestions as described in FIG. 2, block 210 above.

Figure 6:
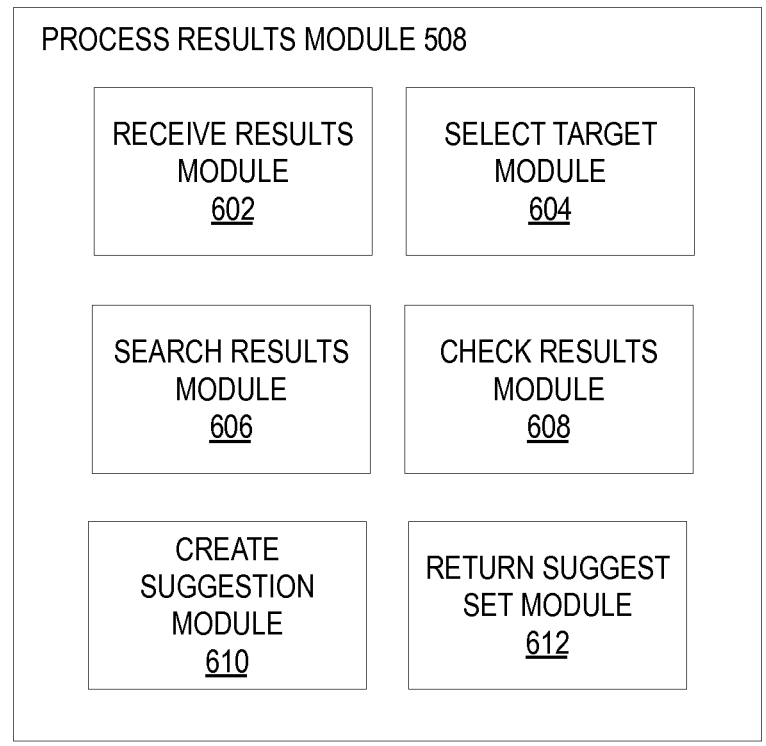
FIG. 6 is a block diagram of one embodiment of a process results module to determine a set of suggested tokenized query completions.

FIG. 6 is a block diagram of one embodiment of a process results module 508 to determine a set of suggested tokenized query completions. In one embodiment, the process module 508 includes a receive results module 602, select target module 604, search results module 606, check results module 608, create suggestion module 610, and return suggestion set module 612. In one embodiment, the receive results module 602 receives the results set and search query prefix as described in FIG. 3, block 302 above. The select target module 604 selects the target gram as described in FIG. 3, blocks 302 and 312 above. The search results module 606 searches the results set for objects that match the target gram as described in FIG. 3, block 306 above. The check results module 608 checks the number of results as described in FIG. 3, block 308 above. The create suggestion module 610 creates the suggestions set as described in FIG. 3, block 310 above. The return suggestion set module 612 returns the suggestion set as described in FIG. 3, block 312 above.

Figure 7:
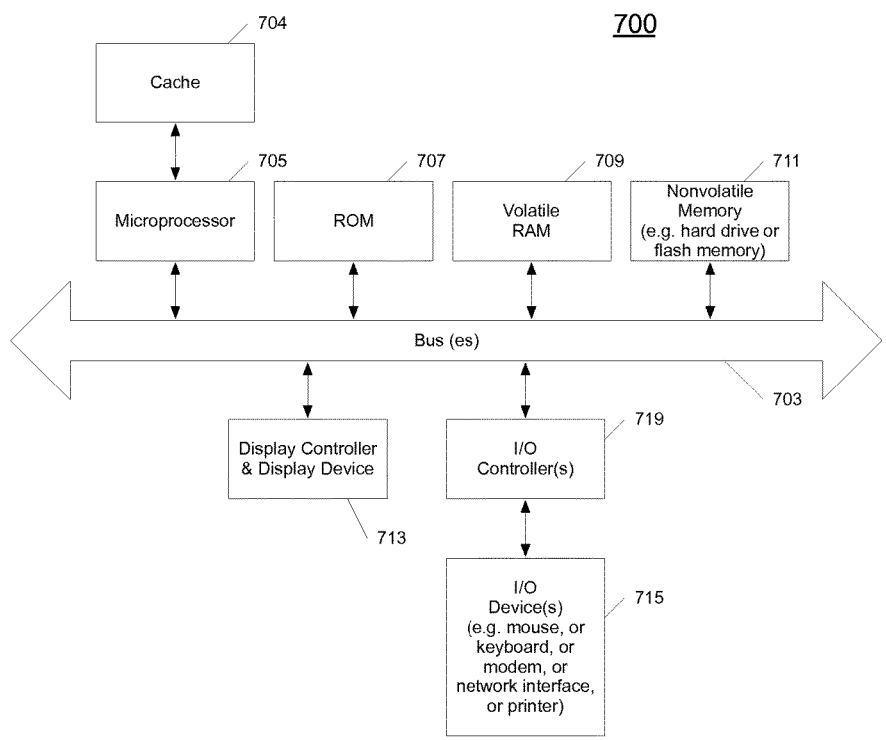
FIG. 7 illustrates one example of a typical computer system, which may be used in conjunction with the embodiments described herein.

FIG. 7 shows one example of a data processing system 700, which may be used with one embodiment of the present invention. For example, the system 700 may be implemented including a device 100 as shown in FIG. 1. Note that while FIG. 7 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 7, the computer system 700, which is a form of a data processing system, includes a bus 703 which is coupled to a microprocessor(s) 705 and a ROM (Read Only Memory) 707 and volatile RAM 709 and a non-volatile memory 711. The microprocessor 705 may include one or more CPU(s), GPU(s), a specialized processor, and/or a combination thereof. The microprocessor 705 may retrieve the instructions from the memories 707, 709, 711 and execute the instructions to perform operations described above. The bus 703 interconnects these various components together and also interconnects these components 705, 707, 709, and 711 to a display controller and display device 713 and to peripheral devices such as input/output (I/O) devices which may be mice, keyboards, modems, network interfaces, printers and other devices which are well known in the art. Typically, the input/output devices 715 are coupled to the system through input/output controllers 713. The volatile RAM (Random Access Memory) 709 is typically implemented as dynamic RAM (DRAM), which requires power continually in order to refresh or maintain the data in the memory.

The mass storage 711 is typically a magnetic hard drive or a magnetic optical drive or an optical drive or a DVD RAM or a flash memory or other types of memory systems, which maintain data (e.g. large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 703 may include one or more buses connected to each other through various bridges, controllers and/or adapters as is well known in the art.

Figure 8:
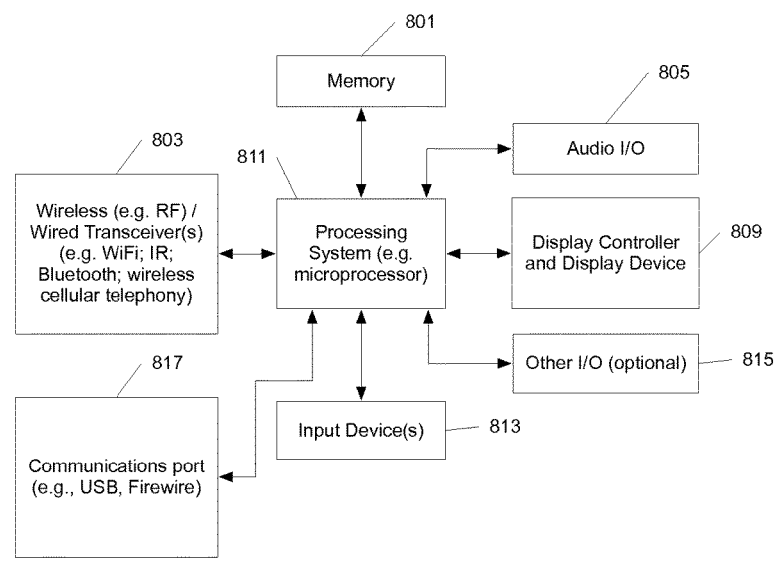
FIG. 8 shows an example of a data processing system, which may be used with one embodiment of the present invention.

FIG. 8 shows an example of another data processing system 800 which may be used with one embodiment of the present invention. For example, system 800 may be implemented as a device 100 as shown in FIG. 1. The data processing system 800 shown in FIG. 8 includes a processing system 811, which may be one or more microprocessors, or which may be a system on a chip integrated circuit, and the system also includes memory 801 for storing data and programs for execution by the processing system. The system 800 also includes an audio input/output subsystem 805, which may include a microphone and a speaker for, for example, playing back music or providing telephone functionality through the speaker and microphone.

A display controller and display device 809 provide a visual user interface for the user; this digital interface may include a graphical user interface which is similar to that shown on a Macintosh computer when running OS X operating system software, or Apple iPhone when running the iOS operating system, etc. The system 800 also includes one or more wireless transceivers 803 to communicate with another data processing system, such as the system 800 of FIG. 8. A wireless transceiver may be a WLAN transceiver, an infrared transceiver, a Bluetooth transceiver, and/or a wireless cellular telephony transceiver. It will be appreciated that additional components, not shown, may also be part of the system 800 in certain embodiments, and in certain embodiments fewer components than shown in FIG. 8 may also be used in a data processing system. The system 800 further includes one or more communications ports 817 to communicate with another data processing system, such as the system 1500 of FIG. 15. The communications port may be a USB port, Firewire port, Bluetooth interface, etc.

The data processing system 800 also includes one or more input devices 813, which are provided to allow a user to provide input to the system. These input devices may be a keypad or a keyboard or a touch panel or a multi touch panel. The data processing system 800 also includes an optional input/output device 815 which may be a connector for a dock. It will be appreciated that one or more buses, not shown, may be used to interconnect the various components as is well known in the art. The data processing system shown in FIG. 8 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 800 may be a network computer or an embedded processing device within another device, or other types of data processing systems, which have fewer components or perhaps more components than that shown in FIG. 8.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "searching," "ranking," "receiving," "determining," "computing," "sending," "selecting," "tokenizing," "filtering," "matching," "creating," "finding," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to generate a tokenized query completion from an inputted query prefix on a device, the method comprising:
   receiving the inputted query prefix from a client, wherein the inputted query prefix includes a plurality of words and the device stores a first plurality of objects, where each of the first plurality of objects includes a plurality of metadata and each of the plurality of metadata has a type;
   generating a results set by searching a structured database using the inputted query prefix for matches to the plurality of grams in the inputted query prefix;
   determining a subset of the inputted query prefix that match specific fields of the results set using the last N grams in the inputted query prefix, wherein N is less than a total number of grams in the plurality of grams;
   ranking a plurality of tokenized query completions based on a number tokens in each of the tokenized query completions, wherein each of the plurality of tokenized query completions includes a token that is a match between a matching gram in the subset of the inputted query prefix and the corresponding specific field for the matching gram and a tokenized query completion with a greater number of tokens is ranked higher than another tokenized query completion with a smaller number of tokens; and
   returning the plurality of tokenized query completions as search suggestions using the inputted query prefix.

2. The non-transitory machine-readable medium of claim 1, wherein a gram is an item in the inputted query prefix.

3. The non-transitory machine-readable medium of claim 2, a gram is selected from the group consisting of a word, phonemes, and syllables.

4. The non-transitory machine-readable medium of claim 1, wherein the structured database includes a plurality of fields storing the plurality of metadata.

5. The non-transitory machine-readable medium of claim 1, wherein the generating the results set further comprises:
   selecting a second plurality of objects that is a subset of the plurality of objects, where each of the second plurality of objects match the plurality of words.

6. The non-transitory machine-readable medium of claim 1, wherein the plurality of metadata is associated with content stored on the device.

7. The non-transitory machine-readable medium of claim 1, wherein the plurality of metadata is associated with content stored remotely from the device.

8. The machine-readable medium of claim 1, wherein the token an indication of the corresponding specific field and the matching gram.

9. The machine-readable medium of claim 8, wherein the token includes the name and the matching gram separated by a delimiter.

10. A method to generate a tokenized query completion from an inputted query prefix on a device, the method comprising:
- receiving the inputted query prefix from a client, wherein the inputted query prefix includes a plurality of words and the device stores a first plurality of objects, where each of the first plurality of objects includes a plurality of metadata and each of the plurality of metadata has a type;
- generating a results set by searching a structured database using the inputted query prefix for matches to the plurality of grams in the inputted query prefix;
- determining a subset of the inputted query prefix that match specific fields of the results set using the last N grams in the inputted query prefix, wherein N is less than a total number of grams in the plurality of grams;
- ranking a plurality of tokenized query completions based on a number tokens in each of the tokenized query completions, wherein each of the plurality of tokenized query completions includes a token that is a match between a matching gram in the subset of the inputted query prefix and the corresponding specific field for the matching gram and a tokenized query completion with a greater number of tokens is ranked higher than another tokenized query completion with a smaller number of tokens; and
- returning the plurality of tokenized query completions as search suggestions using the inputted query prefix.

11. The method of claim 10, wherein the structured database includes a plurality of fields storing the plurality of metadata.

12. The method of claim 10, wherein the generating the results set further comprises:
- selecting a second plurality of objects that is a subset of the plurality of objects, where each of the second plurality of objects match the plurality of words.

13. A device to generate a tokenized query completion from an inputted query prefix on the device, the device comprising:
- at least one processor;
- a memory coupled to the processor though a bus; and
- a process executed from the memory by the processor that causes the processor to receive the inputted query prefix from a client, wherein the inputted query prefix includes a plurality of words, generate a results set by searching a structured database using the inputted query prefix for matches to the plurality of grams in the inputted query prefix and the device stores a first plurality of objects, where each of the first plurality of objects includes a plurality of metadata and each of the plurality of metadata has a type, determine a subset of the inputted query prefix that match specific fields of the results set using a last N grams in the inputted query prefix, wherein N is less than a total number of grams in the plurality of grams, rank a plurality of tokenized query completions based on a number tokens in each of the tokenized query completions, wherein each of the plurality of tokenized query completions includes a token that is a match between a matching gram in the subset of the inputted query prefix and the corresponding specific field for the matching gram and a tokenized query completion with a greater number of tokens is ranked higher than another tokenized query completion with a smaller number of tokens and return the plurality of tokenized query completions as search suggestions using the inputted query prefix.

* * * * *